United States Patent [19]
Glazar

[11] 3,872,456
[45] Mar. 18, 1975

[54] TWO-LEVEL MULTIPLEX ALARM MONITOR FOR HOT BOX DETECTOR SYSTEM

[75] Inventor: Arthur J. Glazar, Kings Park, N.Y.

[73] Assignee: Servo Corporation of America, Hicksville, N.Y.

[22] Filed: Mar. 6, 1974

[21] Appl. No.: 448,668

[52] U.S. Cl............... 340/231, 246/169 A, 340/269
[51] Int. Cl. ......................... G08b 21/00, B61k 9/06
[58] Field of Search..................... 340/231, 269, 47; 246/169 A, 169 D; 308/1 A

[56] References Cited
UNITED STATES PATENTS

| | | | |
|---|---|---|---|
| 2,963,575 | 12/1960 | Pelino et al........................ | 340/231 |
| 3,183,350 | 5/1965 | Sibley ............................... | 340/231 |
| 3,731,087 | 5/1973 | King................................ | 246/169 D |
| 3,812,343 | 5/1974 | Gallagher et al. .................. | 340/231 |

Primary Examiner—Glen R. Swann, III
Attorney, Agent, or Firm—Kane, Dalsimer, Kane, Sullivan and Kurucz

[57] ABSTRACT

A two-level alarm monitor for use with a hot box detector system of the type having first and second sensors each associated with a rail of a track is provided. The monitor includes means connected to the outputs of the sensors for obtaining the difference between the output signals of the sensors and for comparing the difference alternately to first and second predetermined levels which may, for example, represent "warm" and "hot" differential alarm levels or differential alarm levels for friction and roller bearings. The outputs of the sensors are also alternately compared with third and fourth predetermined levels which could, for example, represent "warm" and "hot" absolute alarm levels or absolute alarm levels for friction or roller bearings. The output signals from the comparators are demultiplexed and utilized to generate an alarm signal in the event differential signals or absolute alarm signals exceed associated predetermined levels.

7 Claims, 2 Drawing Figures

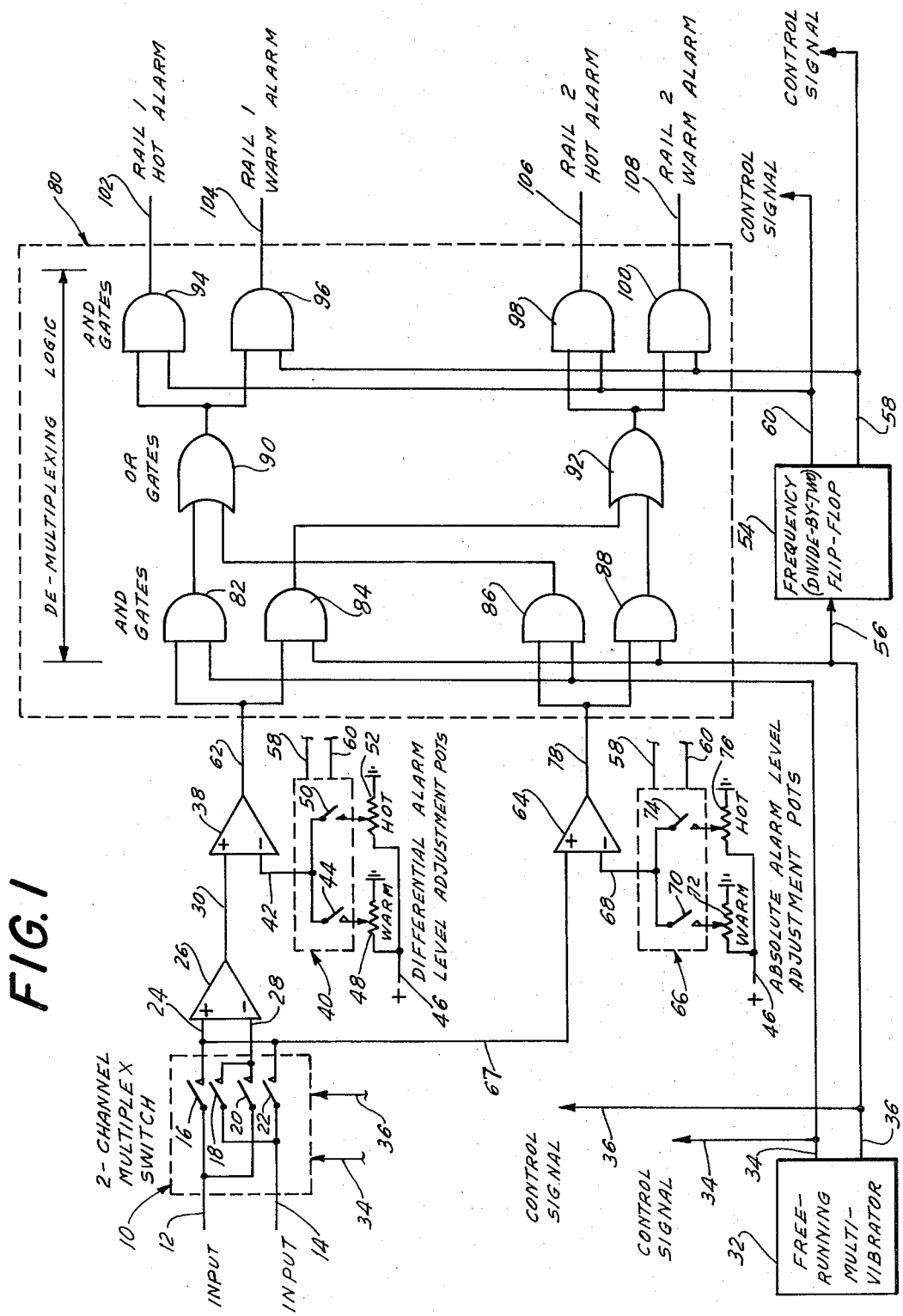

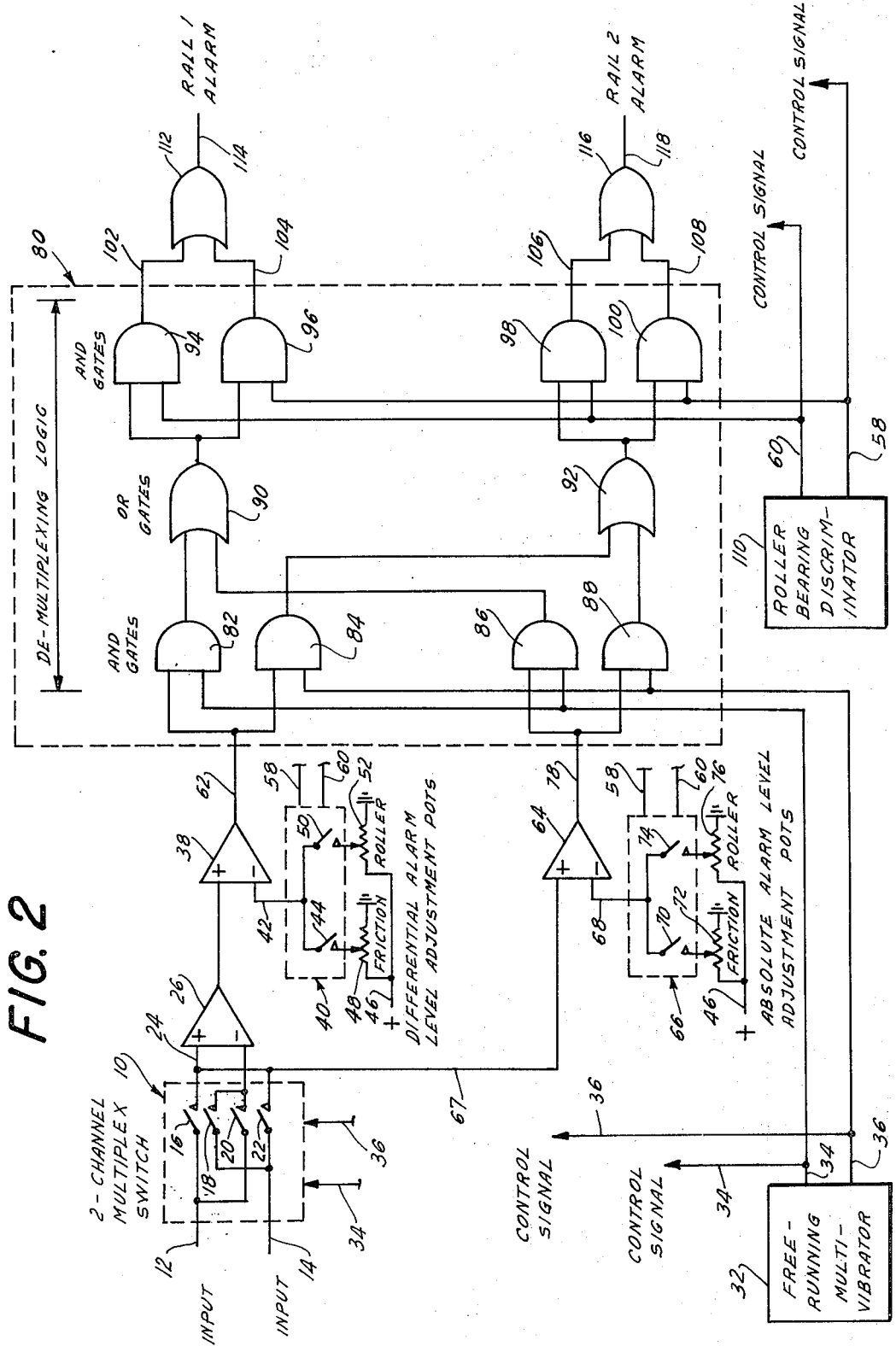

TWO-LEVEL MULTIPLEX ALARM MONITOR FOR HOT BOX DETECTOR SYSTEM

BACKGROUND OF THE INVENTION

The present invention relates to an alarm monitor and more particularly to a two-level alarm monitor for use with a railroad hot box detector system.

A railroad hot box detector system is designed to produce an output for each journal bearing passing the field of view of sensors forming a part of the system. The output of each sensor is roughly proportional to the temperature rise of the journal bearing. When an overheated journal bearing is scanned, the magnitude of the output signal is usually conspicuous when compared to the preponderance of normal journal bearings on a particular train.

The manner in which the output signals are evaluated can vary in concept and complexity depending upon many factors such as cost, efficacy, and reliability. One basic method of evaluation consists of displaying the output signals as "pips" on a strip chart recording with the pip-height representing the magnitude of the detector output. The hot box detector system includes a pair of sensors, one associated with each rail of a track. As a train passes the sensors, each axle generates a pair of pips representing the two journal bearings, left and right (or Rail 1 and Rail 2), associated with each axle. A trained observer can inspect such chart recordings and assess various factors to decide whether a particular pip represents a possibly defective journal bearing.

Methods have been developed to aid such trained observers, or to eliminate the human observer entirely, by mechanizing the evaluation of hot box detector signals. All attempts at total mechanization have been found, by experience, to be less effective than manual evaluation, due to the many variables which must be assessed. One basic mechanization is a simple "absolute alarm monitor." In this scheme, any output pulse which exceeds a predetermined amplitude threshold generates an alarm signal. Another mechanization compares the two output signals produced by journal bearings at opposite ends of each axle; if the comparison indicates that one heat pulse exceeds the other by a predetermined amount, an alarm signal is produced. The comparison may be either geometric (i.e., the ratio between the two heat signals is computed) or arithmetic (i.e., the algebraic difference between the two heat signals is computed). The latter configuration is commonly called a "differential alarm monitor."

The combination of both an "absolute" and a "differential" alarm is in common use at the present time and probably represents the largest percentage of automated or semi-automated evaluation devices in regular service.

Absolute and differential alarm monitors have customarily been designed as modular units employing separate components for RAIL 1, RAIL 2, ABSOLUTE, and DIFFERENTIAL alarm channels. A typical prior art installation thus requires four separate alarm threshold controls: RAIL 1 ABSOLUTE, RAIL 2 ABSOLUTE, RAIL 1 DIFFERENTIAL, and RAIL 2 DIFFERENTIAL. Although the ABSOLUTE and DIFFERENTIAL thresholds are necessarily different, the two rails are usually set for equal ABSOLUTE levels and equal DIFFERENTIAL levels.

The principal object of the present invention is to provide a two-level alarm monitor which, by employing time-division multiplexing, permits just one absolute circuit to serve both rails and one differential circuit to serve both rails. In this manner, the number of controls for a typical system can be reduced in half with an associated cost savings. In addition, the present alarm monitor precludes the possibility of error arising out of a difference in setting between the controls associated with each of the rails.

SUMMARY OF THE INVENTION

The above and other beneficial objectives and advantages are attained in accordance with the present invention by providing a two-level alarm monitor for use with a hot box detector system having a pair of sensors each associated with a rail of track and adapted to generate an output signal responsive to the heat generated by a train wheel bearing passing on its associated rail. The monitor includes means connected to the outputs of the sensors for alternately obtaining the difference between the output signals of the sensors and for comparing the difference alternately to first and second predetermined levels which may, for example, represent "warm" and "hot" differential alarm levels or differential alarm levels for friction and roller bearings. The outputs of the sensors are also alternately compared with third and fourth predetermined levels which could, for example, represent warm and hot absolute alarm levels or absolute alarm levels for friction and roller bearings. The output signals from the comparators are demultiplexed and utilized to generate an alarm signal in the event differential signals or absolute alarm signals exceed associated predetermined maximum levels.

BRIEF DESCRIPTION OF THE DRAWINGS

In the accompanying drawings:

FIG. 1 is a block diagram of a presentation of a two-level alarm monitor in accordance with the present invention; and, FIG. 2 is a block diagram of a two-level alarm monitor substantially identical with the block diagram of FIG. 1 except that selection of the alarm levels is under the control of an auxiliary roller bearing discriminator.

DETAILED DESCRIPTION OF THE PREFERRED EMBODIMENT

Reference is now made to the drawings wherein similar components bear the same reference numeral throughout the both views. In accordance with the present invention, the output signals of the rail 1 and rail 2 sensors are fed to a two-channel multiplex switch 10 through lines 12 and 14 respectively. Switch 10 is shiftable from a first state wherein contacts 16 and 18 are closed and contacts 20 and 22 are open to a second state wherein the reverse is true (i.e., contacts 20 and 22 are closed and contacts 16 and 18 are open). Contacts 16 and 22 serve to interconnect lines 12 and 14 with line 24 connected to the positive input of a linear differential amplifier 26. Similarly, contacts 18 and 20 connect lines 14 and 12 respectively with line 28 connected to the negative input to amplifier 26. Thus, the output of amplifier 26 which appears on line 30 comprises a signal proportional to either (a) the rail 1 sensor signal minus the rail 2 sensor signal (RL1-RL2) or (b) the rail 2 sensor signal minus the rail 1 sensor signal (RL2-RL1) depending on the state of the switch.

The state of switch 10 is governed by a free running multivibrator 32 having a Q output delivered on line 34 and a $\bar{Q}$ output delivered on line 36.

The output of differential amplifier 26 comprises a positive input to a differential comparator 38 through line 30. A negative input to comparator 38 comprises the output of a second multiplex switch 40 through line 42.

Switch 40 includes a first contact 44 connected to a voltage source 46 through an adjustable potentiometer 48 and a second contact 50 connected to the voltage source through a second potentiometer 52. The potentiometers 48 and 52 are set at predetermined levels which may, for example, correspond to difference signals representative of warm and hot bearing conditions respectively.

Switch 40 is shifted between a first state wherein contact 44 is closed and contact 50 is open and a second state wherein the reverse is true through a driving means 54 which may, for example, comprise a divide-by-two flip-flop driven by the $\bar{Q}$ output 36 of multivibrator 32 through line 56. Thus, switch 40 is shifted to its first state wherein contact 44 closes and contact 50 opens by a signal on line 58 and shifts to the reverse position wherein contact 50 closes and contact 44 opens by a signal on line 60. These signals occur in phase opposition at half the frequency of the free running multivibrator 32.

As stated, the differential signal, namely the output of amplifier 26 is fed to the positive input of comparator 38 wherein it is compared with the voltage level predetermined by the settings of potentiometers 48 and 52 which comprise the negative input to comparator 38. The output of comparator 38 thus appears as a positive signal on line 62 if the differential signal exceeds the warm or hot level and as a negative signal if the differential alarm signal does not exceed the warm or hot differential alarm level.

Contacts 16 and 22 are also connected to the positive input of a second differential comparator 64 through line 67. The negative input to amplifier 64 comprises the output of switch 66 through line 68. Switch 66 comprises contact 70 connected to voltage source 46 through potentiometer 72 and contact 74 connected to the voltage source through potentiometer 76. The potentiometers 72 and 76 may be set, for example, at absolute alarm levels for warm and hot bearings. Switch 66 is shiftable from a first state wherein contact 70 is closed and contact 74 is open to a second state wherein the reverse is true by driver 54 along lines 60 and 58. Thus, differential comparator 64 serves to alternately compare the sensor signal for each rail alternately to warm and hot absolute alarm levels. The output of comparator 64 comprises a signal on line 78 which is positive if the rail sensor signal exceeds an absolute alarm level signal and negative when the reverse is true.

The output signals on lines 62 and 78 are fed to demultiplexing logic 80 designed to generate an alarm signal in the event (a) the difference between the sensor signals exceeds one or both of the levels predetermined by the settings of potentiometers 48 and 52 and/or (b) one or both of the sensor output signals exceeds one or both of the absolute alarm levels predetermined by the settings of potentiometers 72 and 76. Accordingly, the demultiplexing logic comprises a series of gates interconnected as follows.

The output of comparator 38 comprises an input to AND gate 82 and an input to AND gate 84. The multivibrator Q output forms the other input to AND gate 82 and the multivibrator $\bar{Q}$ output forms the other input to AND gate 84. Similarly, the output of comparator 64 forms one input to AND gate 86 and one input to AND gate 88. The other input to AND gate 86 comprises the Q output of multivibrator 32 and the second input to AND gate 88 comprises the $\bar{Q}$ output of multivibrator 32. The outputs of AND gates 82 and 86 comprise inputs to OR gate 90 and similarly, the outputs of gates 84 and 88 comprise inputs to OR gate 92. The output of OR gate 90 comprises one input to AND gate 94 and one input to AND gate 96. The other input to AND gate 94 comprises the Q output of flip flop 54 and the other input to AND gate 96 comprises the $\bar{Q}$ output of flip flop 54. Similarly, the output of OR gate 92 comprises one input to AND gate 98 and one input to AND gate 100 while the other input to AND gate 98 comprises the Q output of flip flop 54 and the other input to AND gate 100 comprises the $\bar{Q}$ output of flip flop 54. As will be described in detail forthwith, the output 102 of AND gate 94 comprises the rail 1 hot alarm lead; the output 104 of AND gate 96 comprises the rail 1 warm alarm lead; the output 106 of AND gate 98 comprises the rail 2 hot alarm lead; and the output 108 of AND gate 100 comprises the rail 2 warm alarm lead.

When the output of comparator 38 is positive (indicating a differential alarm condition), a signal will pass (1) gate 82 during the rail 1 sensing portion of the cycle of free running multivibrator driver 32 or (2) gate 84 during the rail 2 sensing portion of the cycle of free running multivibrator driver 32 indicating that the bearing on rail 1 or rail 2 is at the higher temperature. The signal passes through the OR gate 90 and through AND gate 94 during the hot alarm sensing portion of flip flop 54 and AND gate 96 during the warm sensing portion of flip flop 54. Similarly, when the output of comparator 64 is positive (indicating an absolute alarm condition), a signal will pass gate 86 during the rail 1 sensing portion of the cycle of multivibrator 32 when the absolute level of the rail 1 signal exceeds the warm or hot absolute alarm levels predetermined by the adjustments of potentiometers 72 and 76. The signal will pass through OR gate 90 as an alternative first input for AND gates 94 and 96. As before, the signal can pass through AND gate 94 during the hot portion of the cycle of flip flop 54 and through AND gate 96 during the warm portion of the cycle of flip flop 54. In an identical manner, the hot and warm alarms associated with rail 2 can be generated on lines 106 and 108.

The two-level alarm monitor illustrated in FIG. 2 is substantially identical with that just described except that in the embodiment of FIG. 2, potentiometers 48 and 72 are set at levels indicative of an overheated friction bearing while potentiometers 52 and 76 are set at levels associated with overheated roller bearings. Further, in place of the frequency scaling driver 54 of the FIG. 1 embodiment, a roller bearing discriminator 110 is provided to shift switches 40 and 66 between their two states. Such a roller bearing discriminator is described in detail in U.S. Pat. No. 3,812,343 issued to Cornelius A. Gallagher et al. on May 21, 1974 and entitled ROLLER-FRICTION BEARING DISCRIMINATOR FOR HOT BOX DETECTOR SYSTEM. The device therein disclosed is capable of determining whether the incoming heat signal is from a roller bearing or a friction bearing and thus its output is adapted to shift switches 40 and 66 to the appropriate states. In addition, it is to be noted that in the FIG. 2 embodiment, the outputs of gates 94 and 96 are fed to OR gate 112 the output 114 of which is utilized to generate an alarm indicative of a hot box condition on rail 1. Similarly, the outputs of gates 98 and 100 are fed to OR gate 116 the output 118 of which can be used to generate an alarm indicative of a hot box condition on rail 2.

Thus, in accordance with the above, the aforementioned objects and advantages are effectively attained. In the previous description, the multiplexing concept has been utilized to provide two alarm levels. It should be realized that additional levels would be possible by providing additional potentiometers set between the warm and hot levels of the FIG. 1 embodiment and appropriate additional demultiplexing logic.

Having thus described the invention, what is claimed is:

1. A two-level alarm monitor for use with a hot box detector system having a first sensor and a second sensor each associated with a rail of a track and each adapted to generate an output electrical signal responsive to the heat generated by a bearing passing on its associated rail, said alarm monitor comprising:
   a. means connected to the outputs of said sensors for alternately obtaining the difference between (1) said first sensor signal and said second sensor signal and (2) said second sensor signal and said first sensor signal;
   b. first comparator means interconnected to said aforementioned means for comparing the difference between said sensor signals alternately to (1) a first predetermined signal level and (2) a second predetermined signal level;
   c. second comparator means connected to the outputs of said sensors for alternately comparing (1) the output of said first sensor and (2) the output of said second sensor to (3) a third predetermined level and (4) a fourth predetermined level; and,
   d. demultiplexing means connected to said first and second comparators for generating an alarm signal in the event (1) the difference between said sensor signals exceeds one or both of said first or second predetermined levels and/or (2) one or both of said sensor output signals exceeds one or both of said third or fourth predetermined levels.

2. The invention in accordance with claim 1 wherein said difference obtaining means comprises:
   a. a differential amplifier adapted to receive two input signals and to generate an output signal proportional to the difference between said input signals;
   b. first switch means having a first state interconnecting the output signal of one of said sensors with one of said differential amplifier inputs and the output of the other of said sensors with the other of said amplifier inputs and a second state wherein said interconnections are reversed; and,
   c. means for driving said first switch means alternately between said first and second states.

3. The invention in accordance with claim 2 wherein said first comparator means includes:
   a. a first differential comparator adapted to receive two input signals and to generate an output signal, only if the signal applied to one input exceeds a reference voltage applied to the second input;
   b. means interconnecting one of said first differential comparator inputs to the output of said differential amplifier;
   c. second switch means having a first state interconnecting the other of said second differential comparator inputs to said first predetermined level and a second state interconnecting the other of said second differential comparator inputs to said second predetermined level; and
   d. means for driving said second switch alternately between said first and second states.

4. The invention in accordance with claim 3 wherein said driving means for said second switch drives said second switch between its states at half the frequency of the driving means for said first switch.

5. The invention in accordance with claim 3 wherein said second comparator means comprises:
   a. a second differential comparator adapted to receive two input signals and to generate an output signal only if the signal applied to one input exceeds a reference voltage applied to a second input;
   b. third switch means having a first state interconnecting the output signal of one of said sensors to one of said second differential comparator inputs and a second state interconnecting the output signal of the other of said sensors to said one of the second differential comparator inputs;
   c. means for driving said third switch means between its first and second states;
   d. fourth switch means having a first state interconnecting the other of said second differential comparator inputs with said third predetermined level and a second state interconnecting the other of said second differential comparator inputs with said fourth predetermined level; and,
   e. means for alternately driving said fourth switch means between its first and second states.

6. The invention in accordance with claim 5 wherein said third switch means alternates between its states at the same frequency as said first switch means and said fourth switch means alternates between its states at the same frequency as said second switch means.

7. The invention in accordance with claim 5 wherein said first predetermined level comprises a maximum allowable differential alarm level for a friction bearing; said second predetermined level comprises a maximum allowable differential alarm level for a roller bearing; said third predetermined level comprises a maximum allowable absolute alarm level for a friction bearing, said fourth predetermined level comprises a maximum allowable absolute alarm level for a roller bearing and said second and fourth switch driving means comprises the output of a roller bearing discriminator.

* * * * *

UNITED STATES PATENT OFFICE
CERTIFICATE OF CORRECTION

PATENT NO. : 3,872,456
DATED : March 18, 1975
INVENTOR(S) : Arthur J. Glazar

It is certified that error appears in the above-identified patent and that said Letters Patent are hereby corrected as shown below:

Column 6, claim 3, line 11, after "said" change "second" to --first--.

Column 6, claim 3, line 14, change "second" (first occurrence) to --first--.

Signed and Sealed this twenty-first Day of October 1975

[SEAL]

Attest:

RUTH C. MASON
Attesting Officer

C. MARSHALL DANN
Commissioner of Patents and Trademarks